United States Patent [19]
Bourchier et al.

[11] 3,753,692
[45] Aug. 21, 1973

[54] PROCESS FOR THE COPRODUCTION OF ZINC AND SULPHURIC ACID FROM ZINC SULPHIDE ORES

[75] Inventors: Kenneth Arthur Bourchier, Bundoora, Victoria; Donald Fergusson Stewart, Doncaster, Victoria, both of Australia

[73] Assignee: Imperial Chemical Industries of Australia and New Zealand Limited, Victoria, Australia

[22] Filed: Aug. 4, 1970

[21] Appl. No.: 60,908

[30] Foreign Application Priority Data
Aug. 20, 1969 Australia............................ 59791/69
May 21, 1970 Australia............................. 1283/70

[52] U.S. Cl........................ 75/115, 75/120, 423/95, 423/106, 423/530, 204/119
[51] Int. Cl.......................... C01g 9/00, C01b 17/72
[58] Field of Search ............... 23/125, 167; 75/120; 204/119; 423/53, 106

[56] References Cited
UNITED STATES PATENTS
1,241,966  10/1917  Hanley.............................. 23/125 X
1,443,707  1/1923  Gepp................................ 75/120 X
1,443,708  1/1923  Gepp................................ 75/120 X
1,974,886  9/1934  Young............................... 23/125 X
2,435,340  2/1948  Christensen....................... 23/125 X
2,754,174  7/1956  Roberts........................... 204/119 X
3,434,947  3/1969  Steintveit......................... 75/120 X
3,493,365  2/1970  Pickering et al...................... 75/120

Primary Examiner—Oscar R. Vertiz
Assistant Examiner—Charles B. Rodman
Attorney—Cushman, Darby and Cushman

[57] ABSTRACT

A process for the production of zinc and sulphuric acid comprising leaching solid zinc sulphate with an aqueous liquor to form a leach liquor, electrolysing the latter to obtain zinc and a spent electrolyte comprising sulphuric acid, concentrating the sulphuric acid content in the spent electrolyte to precipitate the bulk of the residual zinc sulphate as a solid, separating the latter and so obtaining a sulphuric acid filtrate, and recycling said precipitated zinc sulphate to the electrolysis step in the next cycle by dissolving it in the aqueous leach liquor fed to the electrolysis step. Preferably the starting material (zinc sulphate) is obtained by a controlled oxidation (sulphating) roast of zinc sulphide ore or zinc containing residues obtained in zinc manufacturing processes.

4 Claims, 1 Drawing Figure

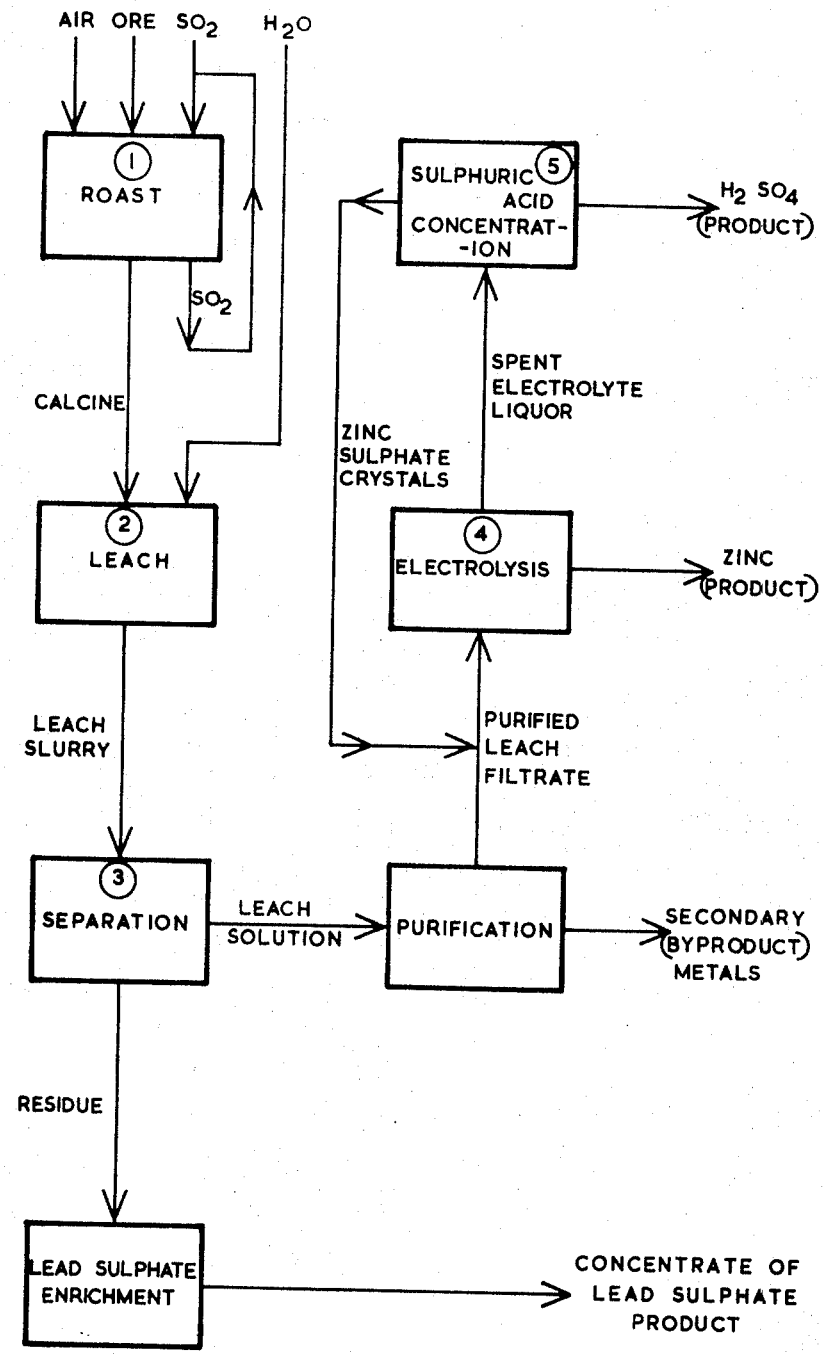

A PROCESS FOR THE COPRODUCTION OF ZINC AND SULPHURIC ACID FROM ZINC SULPHIDE ORES

Thus invention relates to the recovery of zinc values from zinc sulphate solutions; in particular it relates to the recovery of zinc values from zinc sulphate solutions obtained from zinc bearing materials, for example, from sulphide ores such as mixed zinc sulphide, lead sulphide, iron sulphide and silver sulphide ores or from zinc containing residues obtained in zinc manufacturing processes such as an electrolytic manufacturing process.

The conventional process of winning zinc from zinc sulphide ores is exhaustive oxidation; the sulphide is roasted to break the zinc-sulphur bond, zinc is converted to zinc oxide, sulphur is oxidised to sulphur dioxide which, in turn, is catalytically oxidised further to sulphur trioxide and converted to sulphuric acid; the zinc oxide is dissolved in spent recycle electrolyte liquor (electrolysis effluent) which contains sufficient weak sulphuric acid for this purpose; then, after removal of by-product metals and impurities, this solution is electrolysed to produce the desired metallic zinc and said spend recycle electrolyte liquor (electrolysis effluent).

In this process complex, expensive and vast plant capacity is required for removing sulphur from zinc sulphide as sulphur dioxide, for purifying the sulphur dioxide, for oxidising this sulphur dioxide to sulphur trioxide, and for combining the latter with water to form sulphuric acid. In addition it is necessary that this plant capacity be located at the site at which the ore is roasted.

We have now found a process, by which the energy expended in the conventional electrolysis process to form zinc is utilised to produce simultaneously sulphuric acid as a product available for sale and the need to generate an equivalent amount of sulphur dioxide, purify it, oxidise and convert it to sulphuric acid and the cost of the associated plant can be avoided. In addition we have evolved a workup process in which the manufacture of sulphuric acid from zinc sulphide is not physically linked to the roasting process and which, therefore, permits greater flexibility in plant layout and geographic location of the several process steps.

Accordingly we provide a process of recovering zinc values from a zinc sulphate solution, which comprises:

A. electrolysing said solution to yield metallic zinc as a product and spent electrolyte liquor as an intermediate, which is an aqueous solution of sulphuric acid and zinc sulphate;

B. concentrating the sulphuric acid in said spent electrolyte liquor so that its liquid phase contains at least 600 g/l preferably between 900 and 1,150 g/l of sulphuric acid and the bulk of the zinc sulphate is precipitated, separting this precipitate from the liquor and so obtaining sulphuric acid as a product; and C. redissolving said precipitate of zinc sulphate in the feed liquor to the electrolysis step A and thereby fortifying it so as to obtain from it additional zinc as the product.

This process has several important advantages over the conventional process.

In conventional electrolysis processes, the spent electrolyte liquor (electrolysis effluent) is recycled for two reasons:

first: to provide an acid to dissolve the oxide calcine and second: to return to the system the large proportion of the zinc sulphate which it still contains and which would otherwise be lost in the liquor.

In our process, neither of these reasons pertains. Firstly, as already stated, sulphuric acid is not required to dissolve the calcine obtained from the roasting process; instead virtually all of the sulphuric acid formed in the electrolysis step is available for conversion into a saleable product. This represents superior utilisation of electric energy, since no additional power is required to obtain two (Zn and sulphuric acid) instead of one (Zn) electrolysis product. Consequently sulphuric acid plant capacity associated with the formation, the oxidation and the absorption of the bulk of the sulphur dioxide derived from zinc sulphide is not required. The second reason for recycling spent electrolyte liquor — the need to recover zinc — pertains in the conventional process even if the calcining process is modified to yield zinc sulphate which can be dissolved without the use of acid.

In our process this second reason, too, has been obviated by a solids-recovery step.

The virtual absence of recycles of liquors in our process has further advantages; the conventional recycle liquors contain soluble impurities which, on repeated recycling, build up to undesirable levels; consequently additional purification steps have to be introduced. In the process of the present invention the recycled zinc sulphate is crystallised from sulphuric acid as a solid; this solid is relatively pure and, but for the small amount of sulphuric acid which is bound to be associated with it, carries with it very small amounts of impurities only. Consequently less purification is required. The purification step is less complex, too, because the leach liquor is less acidic, hence less neutralising is necessary before purification.

Yet another advantage of our process is its flexibility; since the sulphuric acid is derived from the electrolyte and not the roasting step, its manufacture is not of necessity tied to the site of roasting; electrolysis, our zinc recovery and our sulphuric acid manufacture may be carried out in geographic isolation from the site of roasting; this alleviates the problems associated with environmental pollution by sulphur dioxide production and with transport of sulphuric acid. Greater flexibility results also in the electrolysis step; in the prior art processes the upper limit of the zinc sulphate concentration in the cell feed liquor (electrolyte) was given by the amount of weak sulphuric acid which can economically be generated in the spent electrolyte; using the recycle of solid zinc sulphate according to the present process and leaching of solid zinc sulphate to make up the fresh electrolyte (cell feed), higher concentrations of zinc sulphate and operation over a greater range of concentrations can be attained. This permits flexibility, a higher degree of decomposition per pass through the electrolytic cell, better energy efficiencies (lower operating voltage at higher electrolyte concentration), higher capacity per floor area and greater current density.

The conventional electrolysis of zinc sulphate uses a zinc oxide calcine as its raw material, that is electrowinning of zinc is combined with a conventional oxidising roast producing zinc oxide and sulphur dioxide from zinc sulphide. This combined process has several disadvantages; firstly very large amounts of sulphur dioxide are formed which not only require large plant for conversion to sulphuric acid, as already discussed, but which, in such quantities, present problems of environmental control — air pollution with damage to plants and habitation — and which consequently restrict the choice of geographic location of the roasting plant. In addition the crude zinc calcine, mainly zinc oxide mixed with gangue, is far less readily dissolved in weak sulphuric acid (spend recycle electrolyte liquor) than would be expected from the behaviour of pure zinc oxide. Considerable excess acidity must be provided to achieve practical rates and efficiencies of leaching; this acidity must either subsequently be neutralised with zinc oxide or zinc, or the leaching must be conducted in two or more stages with decreasing acidity; the former reduces the net plant output, the latter requires additional plant; both are costly.

We have now recognised that the ability of our process to utilise zinc sulphate as its starting material enables us to devise a new combination process.

Accordingly we provide a process of recovering zinc from an ore comprising zinc sulphide which process comprises, in combination, converting the zinc sulphide into an aqueous zinc sulphate solution, and then electrolysing said solution to obtain zinc and spent electrolyte liquor, concentrating the sulphuric acid in the spent electrolyte liquor to obtain sulphuric acid and a precipitate of solid zinc sulphate and redissolving said zinc sulphate in the feed liquor to the electrolysis step so as to obtain additional zinc as hereinbefore described.

The zinc sulphate may be obtained by several methods. It may be prepared by dissolving zinc oxide (e.g. the zinc oxide contained in conventional calcine) in the sulphuric acid concentrate obtained in our concentration step B from spent electrolyte; this departure from the conventional process of dissolving calcine in weak spent electrolyte can, at times, be useful for dissolving particularly intractable calcines, or parts thereof.

Alternatively, zinc sulphate could be obtained by a pressure leaching process such as described by V.N. Mackiw and H. Veltman in the Canadian Mining and Metallurgical Bulletin for January, 1967, pp. 80 – 85.

Finally, and this is a preferred embodiment of our invention, zinc sulphate is obtained by applying a process which may be called 'sulphating roasting' to zinc sulphide ores. By 'sulphating roasting' we mean a process of roasting zinc (or lead) sulphide ore under conditions of controlled oxidation such that, in the overall effect, the sulphidic sulphur remains bound to zinc (or lead), the bulk of the zinc (or lead) sulphide is oxidised to sulphate and the formation of sulphur dioxide from zinc or lead sulphide is minimised or substantially eliminated. Sulphating roasting, as far as we are aware, has not hitherto been used technically in the winning of zinc from zinc sulphide; the application of a sulphating roasting process of zinc sulphide ore and the combination of this process with our above described sequence of leaching, electrolysing, concentrating and precipitation provides an entirely new process sequence of winning zinc from zinc sulphide ores which permits the selective recovery of zinc from crude ore, produces sulphuric acid without the generation of sulphur dioxide from the bulk of the zinc sulphide, obviates the formation of zinc oxide and overcomes the difficulties associated with dissolving it.

Accordingly we provide a process which comprises, in combination:

1. roasting an ore comprising zinc sulphide at a temperature in the range of 500° to 800°C in an atmosphere which contains oxygen and sulphur dioxide to convert the ore to a calcine, comprising the bulk of the zinc originally present in the ore in the form of zinc sulphate;
2. leaching said calcine with water or an aqueous solution at a temperature in the range 10° to 100°C, using a solids:liquid ratio up to 2:1 to yield a leach slurry;
3. subjecting said leach slurry to a solids/liquid separation process to yield a leach solution which comprises as dissolved zinc sulphate at least 70 percent of the zinc contained in said calcine, and a residue, which contains silicaceous gangue, insoluble iron and lead compounds;
4. electrolysing said leach solution, optionally and preferably fortified by dissolving in it solid recycle of zinc sulphate from step 5 to yield, as a product, metallic zinc and, as an intermediate, spent electrolyte liquor, which is an aqueous solution of sulphuric acid and zinc sulphate;
5. concentrating sulphuric acid in said spent electrolyte liquor so that its liquid phase contains at least 600 g/l and preferably between 900 and 1,150 g/l of $H_2SO_4$ and the bulk of the zinc sulphate is precipitated, separating this precipitate from the liquor and so obtaining sulphuric acid as a product. As described above, preferably the precipitated zinc sulphate is redissolved in the feed liquor to the electrolysis step and recycled in subsequent operations.

This combined process is particularly useful for certain intractable Zn/Pb ores which are not readily amenable to the conventional processes of oxidative roasting. Ores of this type are characterised by an extremely fine-grained sulphide mineralisation in a siliceous-dolomite matrix, typically represented by the ore body known as the McArthur River deposit of the Northern Territory of Australia. This ore is the subject of a petrological report "A Mineralogical Examination of the McArthur Lead-Zinc-Silver Deposit" by N.J.W. Croxford, presented at the Australasian Institute of Mining and Metallurgy Conference, Mount Isa, 1967. Ores of this type, as well as posing difficulties in primary metallurgical processing, present problems in the subsequent processes of extraction of their useful metal values. They can usually be concentrated by flotation, although with difficulty, but no economical separation of the two major metal values, lead and zinc, has hitherto been achieved. If pyrometallurgical extraction processes are applied to the ores or their concentrates to extract the lead and zinc values by smelting, a slag is formed of undesirable viscosity, the separation efficiencies are low and large amounts of sulphur dioxide are formed. Alternatively, hydrometallurgical processes may be applied to the ore or concentrate, or to the calcined products derived from them, to product solutions of zinc salts suitable for electrolysis. The lead values so obtained are generally insoluble, hence a separation of lead and zinc can be achieved. However, on leaching with spent electrolyte, the iron present in the ores and concentrates is solubilised along with the zinc and presents a major problem in the subsequent electrolysis step which is used to obtain metallic zinc. As a consequence the McArthur River deposits, although a major Australian mineral find and subject of much investigation over the years, to-date have not yet been exploited. These difficulties can be overcome by the present process; we have shown that the ore can be resolved with high yields, that by-product metals such as lead, silver, cadmium and copper are readily recovered, and that iron, the separation of which is particularly troublesome, and other impurities are readily removed. The removal of iron is particularly effective when the controlled oxidation technique is used, by which iron sulphide is oxidised preferentially to its oxides, while zinc and lead sulphide are oxidised selectively to the respective sulphates.

Accordingly a particularly preferred process of our invention is characterised in that zinc sulphide ore or ore concentrate is roasted in two steps, wherein the first step comprises roasting said ore in the presence of oxygen, preferably air, and sulphur dioxide at a temperature between 50° and 800°C, preferably 650° and 750°C, to convert the bulk of the zinc sulphide into zinc sulphate and the second step comprises maintaining the roast at a temperature between 400° and 700°C, preferably between 450° and 600°C in an atmosphere from which sulphur dioxide has been substantially displaced by air or oxygen or purged to decompose water-soluble iron compounds.

The subsequent extraction, purification, electrolysis, precipitation and concentration steps are then carried out as above described.

The individual steps of the present process are described below;

1. Roasting

The invention is applicable to ores containing zinc sulphide which may or may not be partially oxidised. It is preferred to apply the process of the invention to the concentrate of such ores as are obtained by conventional concentration processes.

If an ore is used without concentration, the preferred particle size range is −60 to +300 B.S.S. mesh. Concentrate is suitable in the particle size range obtained from the concentrators.

As already stated, the roasting process is preferably carried out that is in two steps, the first involving the formation of sulphates and the second involving the decomposition of iron sulphate. Alternatively the roasting may be carried out in one step at a temperature between 600° and 750°C.

The suitable apparent ratio of $SO_2 : O_2$ present during the initial roasting stage is between 10:1 and 1:2 and the preferred ratio is between 5:1 and 5:6. It is referred to as "apparent ratio" because it is known that some of the sulphur dioxide present is oxidised to sulphur trioxide; these ratios are therefore defined as the amount of sulphur dioxide plus sulphur trioxide (expressed as sulphur dioxide) present in relation to the amount of oxygen.

Towards the end of the roasting process the partial pressure of sulphur dioxide and sulphur trioxide is preferably kept to a practical minimum which is equivalent to or very close to that from the iron sulphate present, and the temperature is reduced to the range from 450° to 600°C.

2. Leaching

The aqueous liquor used to leach the calcine obtained from the roast is essentially water, but it is preferred that a base is added so that the pH of the resulting solution is in the range 5.0 to 5.5 to lower the amount of iron dissolved. The preferred base is ammonia and the preferred temperature range is 60° to 90°C. The preferred solid/liquid ratio is in the range from 1:4 to 1:1. By solid/liquid ratio we mean the weight ratio of total, dissolved and undissolved, solids to water.

3. Phase Separation and Purification

The leach slurry, essentially, consists of a water phase comprising in solution, zinc sulphate, some iron sulphate, and soluble salts of other trace metals associated with the ore, and a solid phase comprising lead sulphate, iron oxides, ferrities, siliceous gangue and insoluble compounds of other trace metals associated with the ore.

These phases are separated by conventional processes involving the use of hydrocyclones, and/or thickeners and/or filters.

The liquid pahse, hereinafter referred to as leach solution, may and usually does contain impurities, such as iron, arsenic, cadmium, antimony and copper, which, if present in sufficient quantities, are detrimental to the subsequent electrolysis step, and must therefore be removed before electrolysis. The methods of keeping these impurities below the levels acceptable for electrolysis are known from the prior art. One widely practised method is to add zinc dust to the leach solution; a zinc dust precipitate forms, is separated from the solution and the trace metal values contained in it may be reqovered, if desired. Further purification steps may be necessary depending on the character of the ore being treated.

As stated, it is preferred to fortify the leach solution after purification with the solid zinc sulphate, which is obtained in the concentration step from the concentrated spent electrolyte liquor. The foritifed leach solution is then subjected to electrolysis. The solid residue from the leaching step comprising gangue and usually lead is worked up as described in step 5.

4. Electrolysis

The electrolysis step is carried out in a manner known e.g. from Mantell, Industrial Electrochemistry, McGraw Hill, 1950 Edition, pp. 362 to 364, with the following important differences:

a. the feed electrolyte, preferably, is fortified as described, with solid zinc sulphate, which may constitute up to one third of the total zinc content in the feed electrolyte; consequently the degree of electrolytic decomposition per pass may be higher than in the prior art;

b. the spent electrolyte is not recycled to the extraction step but worked up as described below. From the electrolysis metallic zinc is then obtained in the conventional manner.

5. Concentration

The limit to which electrolysis can be driven depends on the amount of sulphuric acid formed and the residual amount of zinc dissolved in the spent electrolyte. Complete electrolysis is not possible; consequently some zinc will remain in solution and must be recovered. To this end the sulphuric acid in the spent electrolyte liquor is concentrated until the concentration of free sulphuric acid is greater than 600 g/l, preferably between 900 g/l and 1,150 g/l. At a concentration of 900 g/l substantially all of the zinc will have crystallised out as zinc sulphate, which is separated from the sulphuric acid, e.g. by decantation, filtration or preferably by centrifuging.

By concentrating the sulphuric acid we mean increasing the sulphuric acid content of the spent electrolyte liquor to the desired level by one of several methods; these are:

i. concentrating the spent electrolyte liquor by evaporating water; or,
ii. adding more concentrated sulphuric acid (e.g. 98% $H_2SO_4$) to the spent electrolyte liquor; or,
iii. absorbing sulphur trioxide in the spent electrolyte liquor; or,
iv. a combination of steps i and ii; or,
v. a combination of steps i and iii; or,
vi. a combination of steps ii and iii; or,
vii. a combination of steps i, ii and iii. The combinations of steps iv and vii inclusive, particularly the use of more concentrated sulphuric acid or sulphur trioxide after the evaporation, have the advantage that less heat is required than when evaporation alone is used. The more concentrated sulphuric acid may be obtained from the sulphuric acid produced in the system of absorption of sulphur trioxide or, of course, from an outside source, e.g. purchase.

The mother liquor from the concentration/filtration squence is sulphuric acid, as useful byproduct. If it is required in a more concentrated form, then the above-mentioned concentration step may be extended by addition of sulphur trioxide to the concentrated electrolyte liquor in an absorption step such as is normally used in sulphuric acid manufacture; alternatively, it may be concentrated further by evaporation.

The zinc sulphate, which may contain some entrained sulphuric acid, is preferably recycled to the leach solution, most preferably between the purification and electrolysis steps, as described above and as indicated in the diagram of the FIGURE.

6. Work-up of Solids after Leaching

The solid phase or residue from the leaching step commonly contains lead in the form of sulphate in quantities worthy of recovery. The lead values may be recovered from the leach residue by conventional processes, e.g. smelting. Preferably, however, the lead sulphate from the residue is first concentrated by flotation; as a concentrate it is suitable for further processing to recover the lead values. This concentration process may be enhanced by treating the residue with sulphuric acid, preferably from the processing of the spent electrolyte liquor, to remove most of the iron content leaving a residue of lead sulphate and silicaceous gangue.

Alternatively the lead may be concentrated by extraction with sodium hydroxide or by other methods.

7. Combined Process

The combined process of this invention is illustrated in the diagram of the FIGURE of this specification in which each numbered box represents a step as described. The raw materials are the ore or ore concentrate, air, water and sulphur dioxide and the effluents and products are as labelled. The sulphur dioxide used in the process may be generated within the process from the sulphur associated with iron and possibly with the lead. The primary products are zinc metal, lead sulphate concentrate and sulphuric acid. Other valuable secondary products such as copper and silver may be obtained.

Our invention may also be used to extract the zinc values from normally intractable residues obtained in zinc manufacturing processes such as an electrolytic manufacturing process.

Accordingly we provide a process which comprises, in combination:

1. roasting a zinc residue at a temperature in the range of 500° to 800°C in an atmosphere which contains oxygen and sulphur dioxide to convert the residue to a calcine, comprising the bulk of the zinc originally present in the residue in the form of zinc sulphate;
2. leaching said calcine with water or an aqueous solution at a temperature in the range 10° to 100°C, using a solids:liquid ratio up to 2:1 to yield a leach slurry;
3. subjecting said leach slurry to a solids/liquid separation process to yield a leach solution which comprises as dissolved zinc sulphate at least 70 percent of the zinc contained in said calcine, and a residue, which contains silicaceous gangue, insoluble iron and lead compounds;
4. electrolysing said leach solution, optionally and preferably fortified by dissolving in it solid recycle of zinc sulphate from step 5 to yield, as a product, metallic zinc and, as an intermediate, spent electrolyte liquor, which is an aqueous solution of sulphuric acid and zinc sulphate;
5. concentrating sulphuric acid in said spent electrolyte liquor so that its liquid phase contains at least 600 g/l and preferably between 900 and 1,150 g/l of $H_2SO_4$ and the bulk of the zinc sulphate is precipitated, separating this precipitate from the liquor and so obtaining sulphuric acid as a product. As described above, preferably the precipitated zinc sulphate is redissolved in the feed liquid to the electrolysis step and recycled in subsequent operations.

The leach solution may optionally be treated according to processes known in the art to remove dissolved iron. For example, air may be bubbled through the solution to precipitate the iron as iron hydroxide which may subsequently be removed. Another suitable method is to treat the solution with a mixture of ammonium or sodium salt and manganese dioxide and to remove the precipitated iron compounds.

In our invention any suitable method of separating the bulk of the zinc sulphate from the liquor may be employed. Suitable methods known in the art are, for example, salting or freezing out the zinc sulphate or the use of various known dialysis procedures using semipermeable membranes. Preferably we use the concentration procedure described hereinabove.

Accordingly we provide a process of recovering zinc values from a zinc sulphate solution which comprises, in combination:

a. electrolysing said solution to yield metallic zinc as a product and spent electrolyte liquor as an intermediate which is an aqueous solution of sulphuric acid and zinc sulphate;
b. separating the zinc sulphate from the said spent electrolyte liquor; and
c. redissolving said zinc sulphate in the feed liquor to the electrolysis step $a$ and thereby fortifying it so as to obtain from it additional zinc as the product.

The zinc sulphate solution may be derived from any zinc bearing material. The invention is especially useful when conventional methods of winning zinc from the zinc bearing material have hitherto been considered to be difficult or uneconomic.

The zinc sulphate solutions, may for example, be derived from a zinc bearing material such as an ore or a zinc residue obtained in a zinc manufacturing process. Preferably the ore comprises zinc sulphide. In this specification the term ore is used to mean ore, ore concentrate or pelletized ore concentrate.

The sulphating roast hereinbefore described may be carried out using either a fixed bed or a fluidised bed of ore particles.

The choice of the type of bed is related to the size of the operation. Thus on a small scale it may be economically desirable to use a fixed bed, whereas fluidized beds may become more convenient as the scale of operation is increased.

The invention is now illustrated by, but not limited to, the following examples.

Example 1 to 14 inclusive

Sampels of a flotation concentrate of McArthur River ore of average analysis of 27.0% Zn, 12.8% Fe, 11.0% Pb and 29.1% S were roasted under the conditions outlined in Table 1. After completion of the roasting step the calcines were extracted in boiling water (5 g calcine in 50 ml water). The amounts of zinc and iron extracted thereby were determined by X-ray fluorescence and atomic absorption techniques. The results are given in Table 1.

Example 23

An aqueous solution of sulphuric acid and zinc sulphate of the following composition:

| | |
|---|---|
| Zinc sulphate $ZnSO_4$ | 50 g /l |
| Sulphuric acid $H_2SO_4$ | 98 g /l | which is typical of spent electrolyte liquor, was concentrated by evaporation. The amounts of zinc dissolved and the amount of zinc sulphate precipitated at various stages of concentration were determined. The results are given in Table 3.

TABLE 3

| $H_2SO_4$ g/l | Mls of Soln. | Zn g/l | Wt. of Zn in Soln. (g.) | Zinc sulphate precipitated expressed as % of zinc sulphate in starting solution |
|---|---|---|---|---|
| 98 | 1000 | 50 | 50 | 0 |
| 200 | 490 | 79 | 38.7 | 22.6 |
| 400 | 245 | 124 | 30.4 | 39.2 |
| 600 | 163 | 47.4 | 7.7 | 84.6 |
| 700 | 140 | 12.5 | 1.75 | 96.5 |
| 800 | 122.5 | 5.5 | 0.68 | 98.64 |
| 900 | 109 | 1.5 | 0.164 | 99.67 |
| 1000 | 98.1 | 1.5 | 0.147 | 99.71 |
| 1100 | 89 | 1.5 | 0.134 | 99.73 |
| 1200 | 81.6 | 1.2 | 0.098 | 99.80 |

TABLE 1

| | Roasting 1st stage | | | Roasting 2nd stage | | | Percent of Zn in ore extracted | Percent of Fe in ore extracted |
|---|---|---|---|---|---|---|---|---|
| Exp. No. | Temp., °C. | Air:$SO_2$ ratio | Time, hrs. | Temp., °C. | Air:$SO_2$ ratio | Time, hrs. | | |
| 1 | 500 | 3.33:1 | 4 | 500 | Air only | 1 | 29.5 | 8.8 |
| 2 | 650 | 3.33:1 | 4 | 600 | do | 1 | 85.3 | 4.5 |
| 3 | 700 | 3.33:1 | 3 | 600 | do | 1 | 86.7 | 3.25 |
| 4 | 700 | 0.75:1 | 2 | 600 | do | 1 | 46.2 | 0.0 |
| 5 | 700 | 1.08:1 | 2 | 600 | do | 1 | 91.5 | 11.4 |
| 6 | 700 | 2.0:1 | 2 | 600 | do | 1 | 87.8 | 3.4 |
| 7 | 700 | 2.5:1 | 2 | 600 | do | 1 | 91.8 | 6.9 |
| 8 | 700 | 3.33:1 | 3 | 600 | do | 1 | 86.2 | 2.9 |
| 9 | 700 | 5.0:1 | 2 | 600 | do | 1 | 87.4 | 2.7 |
| 10 | 700 | 6.0:1 | 2 | 600 | do | 1 | 88.0 | 2.8 |
| 11 | 700 | 7.5:1 | 2 | 600 | do | 1 | 75.0 | 0.0 |
| 12 | 700 | 2.5:1 | 2 | 600 | 2.5:1 | 1 | 91.2 | 10.0 |
| 13 | 700 | 3.33:1 | 3 | 600 | 3.33:1 | 1 | 90.5 | 8.1 |
| 14 | 700 | 2.5:1 | 2 | 600 | Flow of air and $SO_2$ discontinued | 1 | 92.7 | 9.7 |

NOTE.—The air:$SO_2$ ratio defines the atmosphere in the furnace under equilibrium conditions.

Example 15 to 22 inclusive

A calcine from a sample of McArthur River ore concentrate was prepared by three hours' roasting at 700°C under an air:$SO_2$ atmosphere of 3.33:1, followed by treatment at 600°C for 1 hour with air only input. The calcine was leached with the solution shown in Table 2 at a solids/liquid ratio of 1:10 and at a temperature of 80°C.

TABLE 2

| Ex. No. | Leach Solution | % Extraction of Zn | Fe | Final pH |
|---|---|---|---|---|
| 15 | Water | 86.7 | 12.5 | 3.3 |
| 16 | Water with air bubbled through | 87.4 | 10.0 | 3.3 |
| 17 | 0.5N $H_2SO_4$ | 91.4 | 30.5 | <1.0 |
| 18 | 0.1N NaOH | 76.6 | 6.7 | 6.0 |
| 19 | 0.3N NaOH | 85.0 | 10.0 | 5.4 |
| 20 | 0.3N $NH_4OH$ | 49.6 | 0 | 6.1 |
| 21 | 0.6N $NH_4OH$ | 84.7 | 4.7 | 5.7 |
| 22 | 0.3N $NH_4OH$ | 87.2 | 2.2 | 5.2 |

The proportions of zinc and iron originally present in the calcine and leached out by the treatment are reported in Table 2. It is seen from this that if the pH of the leach liquor is less than 1.0, inacceptably large amounts of iron are dissolved.

Example 24

All analysis figures relevant to this example are shown in Table 4. 400.0 g of calcine (I) from a sulphating roast carried out as described in Example 13 was leached with 800 ml of distilled water at 80°C for approximately one-half hour with continuous stirring. The residue (II) was filtered from the slurry, washed with water, and dried. This material was analysed by x-ray fluroescence. The filtrate or leach solution (III) was diluted to one litre with distilled water and 50 ml. of this solution was retained for analysis by atomic absorption spectroscopy.

950 ml. of leach solution was treated with 20 g. of coarse zinc dust while stirring and heating the solution. The black solid residue from this treatment was filtered off, ignited and weighed (22 g.). This material was dissolved in nitric acid and, on analysis by atomic absorption spectroscopy, was found to contain 0.73 percent copper and 0.07 percent silver and 84 percent Zn. The leach solution was further treated by bubbling air through the solution and heating. The leach solution was filtered to remove the ferric hydroxide precipitated during this procedure and 50 ml of the thus purified filtered solution (IV) taken for analysis by atomic absorption spectroscopy. Zinc sulphate (116 g Zn SO₄ · H₂O) (V), the expected yield from the above described concentration step (Example 23) applied to the spent electrolyte liquor was dissolved in the remaining 850 ml. of each solution and the resulting solution (VI) electrolysed in a cell with a lead anode and an aluminum cathode. Electrolysis was carried out for 14.5 hours at 4₂ volts and 3.8 amps in a cell with a cathode area of 25 ins. At the end of this period the zinc (VII) deposited was stripped from the cathode washed, dried and weighed. The acid solution remaining in the electrolysis cell plus washings (spent electrolyte liquor (VIII)) had a volume of 1,200 ml , 50 ml of this solution was taken for analysis.

The remaining 1,150 ml of the spent electrolyte liquor was concentrated until it contained 1,030 g H₂SO₄/litre. During this concentration zinc sulphate monohydrate (IX) (identified by X-ray diffraction) was precipitated. The electrolysis step had removed more zinc than was expected and hence after cooling to 20°C a total of only 105 g of ZnSO₄·H₂O precipitated and was separated from the sulphuric acid product (X) by filtration. Zinc balances across the various steps are reported in Table 4.

Example 26

1 litre of electrolyte liquor at a concentration of 40.6 g/l zinc as zinc sulphate and 93 g/l with respect to sulphuric acid was prepared as described in Example 25. This solution was concentrated in a stepwise manner, zinc sulphate monohydrate being filtered off at various sulphuric acid concentrations, washed with water and dried, and the washings returned to the liquor being concentrated. In this manner 102 g of zinc sulphate monohydrate was precipitated and separated from the solution. 49. ml of sulphuric acid at a concentration of 1,799 g/l was added to the 100 ml of the filtrate having a concentration of 795 g/l of sulphuric acid to produce 147.2 ml of final acid at a concentration of 1,114 g/l with respect to sulphuric acid and 1.16 g/l with respect to dissolved zinc. This addition of acid caused the precipitation of a further 4.4 g of zinc sulphate monohydrate.

Example 27

All analysis figures relevant to this example are shown in Table 6.

This example shows the application of the process to the normally intractable residue obtained in a conven-

TABLE 4.—ANALYTICAL DATA AND ZINC BALANCE

| | | Solids on w./w. basis, liquids w./v. | | | Zinc balance as percent of Zn in— | | | |
|---|---|---|---|---|---|---|---|---|
| Item of Ex. 24 | Sample | Percent Zn | Percent Pb | Percent Fe | Calcine | Leach solution | Electrolysis solution | Spent electrolyte |
| I | Sulphated calcine | 21.5 | 8.4 | 10.3 | 100 | | | |
| II | Leach residue | 3.6 | 20.6 | 22.0 | 7 | | | |
| III | Leach solution | 8.0 | 0.004 | 0.53 | 93 | | | |
| IV | Purified leach solution | 8.125 | ND | 0.41 | 94 | 100 | | |
| V | Zinc sulphate | ND | ND | ND | | 61½ | | |
| VI | Electrolysis liquor | 12.3 | ND | ND | | 161½ | 100 | |
| VII | Zinc metal | 99 | | | | | 61 | |
| VIII | Spent electrolyte liquor | 3.25 | ND | 0.31 | | | 39 | 100 |
| IX | Zinc sulphate precipitate | 21.3 | ND | ND | | | | 99½ |
| X | Sulphuric acid product | 0.25 | ND | 0.095 | | | | ½ |

Example 25

All analysis figures and zinc balances relevant to this Example are shown in Table 5.

Conditions for leaching and solution purification were as in Example 24 with the exception that the leach solution used contained 0.48 g of ammonia and further ammonia was added during iron removal in order to bring the solution pH up to 5.5. Zinc sulphate monohydrate prepared in Example 24 was added to the leach solution prior to electrolysis. Electrolysis was carried out at 4 volts and 3.85 amp for a period of 16.75 hours in a cell with a cathode area of 12 ins². Concentration of the acid solution after electrolysis was continued untilit contained 956 g H₂SO₄/litre. Otherwise procedures were as described in Example 24.

tional electrolytic zinc plant. The residue used consisted mainly of zinc ferrite and contained 23.2% w/w zinc, 31.8% w/w iron and 0.24% w/w Cu.

The zinc plant residue was subjected to a sulphating roast with a first stage of 4 hours at a temperature of 700°C and an air to sulphur dioxide ratio in the roaster gases of 8:1 and a second stage roast at 600°C for one-half hour with air only in the roaster gases. 600 g of the calcine (1 of Table 6) from this roast was leached with 800 ml of distilled water at 80°C for approximately one-half hour with continuous stirring. The residue (2) was filtered from the slurry, washed with water and dried. This material was analysed by X-ray fluorescence spectroscopy. The filtrate or leach solution (3) was diluted to 1 litre with distilled water and 50 ml of

TABLE 5.—ANALYTICAL DATA AND ZINC BALANCE

| | | Solids on w./w. basis, liquids w./v. | | | Zinc balance as percent of Zn in— | | | |
|---|---|---|---|---|---|---|---|---|
| Item of Ex. 25 | Sample | Percent Zn | Percent Pb | Percent Fe | Calcine | Leach solution | Electrolysis solution | Spent electrolyte |
| I | Sulphated calcine | 21.5 | 8.4 | 10.3 | 100 | | | |
| II | Leach residue | 3.6 | 20.6 | 22 | 7 | | | |
| III | Leach solution | 8.0 | 0.004 | 0.54 | 93 | | | |
| IV | Purified leach solution | *7.6 | ND | 0.26 | 88 | 100 | | |
| V | Zinc sulphate recycle precipitate | ND | ND | ND | | 64½ | | |
| VI | Electrolysis liquor | 7.94 | ND | 0.23 | | 164½ | 100 | |
| VII | Zinc metal | 99 | ND | ND | | | 60 | |
| VIII | Spent electrolyte liquor | 2.38 | ND | 0.19 | | | 40 | 100 |
| IX | Zinc sulphate precipitate | 16.1 | ND | ND | | | | 98½ |
| X | Sulphuric acid product | 0.61 | | 0.07 | | | | 1½ |

*In this example zinc compounds were co-precipitated with the iron oxides during the purification stage.

this solution was retained for analysis by atomic absorption spectroscopy.

In order to reduce the iron content of the leach solution, 950 ml of leach solution was treated with 7 g of ammonium sulphate and 1 g of manganese dioxide. The solution was boiled for 4 hours and allowed to stand overnight before filtering. The precipitate so produced weighed 7.5 g and on analysis by X-ray fluorescence spectroscopy was found to contain 49.0% w/w iron and 5.7% w/w zinc. The filtrate was made up to 1 litre and was further purified by addition of 20 g of coarse zinc dust while heating and stirring the solution. The residue from this treatment was filtered washed, dried and weighed (31.4 g). This material was dissolved in nitric acid and, on analysis by atomic absorption spectroscopy, was found to contain 2.8% w/w copper and 61% w/w zinc. The leach solution was made up to 1 litre and 50 ml of this solution (4) taken for analysis by atomic absorption spectroscopy. To the remaining 950 ml of solution was added 137 g of zinc sulphate monohydrate (5), the solution was made up to 1 litre an 50 ml of this solution (6) taken for analysis. The remaining 950 ml was electrolysed for 17 hours at 4 volts and 5 amps in a cell with a cathode area of 25 ins². At the end of this time the zinc deposited (7) was stripped from the cathode, washed, dried and weighed. The acid solution remaining in the electrolysis cell plus washings (spent electrolyte liquor (8)) had a volume of 1,200 ml, 50 ml of this solution was taken for analysis.

The remaining 1,150 ml of the spent electrolyte liquor was concentrated until it contained 1,127 g $H_2SO_4$ / litre. During this concentration zinc sulphate monohydrate (9) was precipitated and separated from the sulphuric acid product (10) by filtration.

The numerals 1 to 10 inclusive refer to Table 6.

TABLE 6.—ANALYTICAL DATA AND ZINC BALANCE

| Item of Ex. 27 | Sample | Solids on w./w. basis, liquids w./v. | | Zinc balance as percent of Zn in— | | | |
|---|---|---|---|---|---|---|---|
| | | Percent Zn | Percent Fe | Calcine | Leach solution | Electrolysis solution | Spent electrolyte |
| 1 | Sulphated calcine | 22.0 | 35.9 | 100 | | | |
| 2 | Leach residue | 5.7 | 65.0 | 13.5 | | | |
| 3 | Leach solution | 11.9 | 0.42 | 86.5 | | | |
| 4 | Purified leach solution | 12.0 | 0.16 | | 100 | | |
| 5 | Zinc sulphate | ND | ND | | 48½ | | |
| 6 | Electrolysis liquor | | | | 148½ | 100 | |
| 7 | Zinc metal | 99 | | | | 62 | |
| 8 | Spent electrolyte liquor | 5.76 | 0.07 | | | 38 | 100 |
| 9 | Zinc sulphate precipitate | 29.4 | 0.12 | | | | 99½ |
| 10 | Sulphuric acid product | 0.26 | 0.06 | | | | ½ |

Example 28

100 ml of electrolyte liquor at a concentration of 30 g/l zinc as zinc sulphate and 100 g/l with respect to sulphuric acid was prepared as described in Example 25. This solution was treated with 365 ml of 25% w/w oleum. The heat of mixing caused some of the liquor to evaporate and the final solution contained 915 g/l of sulphuric acid. The precipitated zinc sulphate monohydrate was filtered off and after drying weighed 5.5 g.

Example 29

100 ml of electrolyte liquor at a concentration of 30 g/l zinc as zinc sulphate and 100 g/l with respect to sulphuric acid was prepared as described in Example 25. This solution was treated with 386 mls of 98% w/w sulphuric acid. The heat of mixing caused some of the liquor to evaporate and the final solution containing 890 g/l of sulphuric acid. The precipitated zinc sulphate monohydrate was filtered off and after drying weighed 5.5 g.

We claim:

1. A process which comprises in combination:
   a. roasting a zinc bearing material selected from the group consisting of iron-containing zinc sulphide ore and iron-containing residues from a zinc manufacturing process at a temperature in the range 500°C to 800°C in an atmosphere which contains oxygen and sulphur dioxide to convert the zinc bearing material to a calcine comprising the bulk of the zinc originally present in the zinc bearing material in the form of zinc sulphate;
   b. leaching said calcine with water or an aqueous solution at a temperature in the range of 10°C to 100°C, using a solids: liquid ration up to 2:1 to yield a leach slurry;
   c. subjecting said leach to a solids/liquid separation process to yield a leach solution which comprises as dissolved zinc sulphate at least 70 percent of the zinc contained in said calcine, and a residue, which contains silicaceous gangue, and any insoluble iron and lead compounds;
   d. electrolysing said leach solution to yield, as a product, metallic zinc and, as an intermediate, spent electrolyte liquor, which is an aqueous solution of sulphuric acid and zinc sulphate;
   e. concentrating sulphuric acid in said spent electrolyte liquor so that its liquid phase contains at least 600 g/l of $H_2SO_4$ and the bulk of the zinc sulphate is precipitated; and
   f. separating this precipitate from the liquid and so obtaining sulphuric acid as a product, the precipitated zinc sulphate being redissolved in the feed liquor to the electrolysis step and recycled in subsequent operations, said zinc bearing material being roasted in step (a) in two steps, wherein a first step comprises roasting said material in an atmosphere comprising oxygen and sulphur dioxide at a temperature in the range from 500° to 800°C to convert the bulk of the zinc into zinc sulphate and the second step comprises maintaining the roast at a temperature in the range from 400° to 700°C in an atmosphere from which sulphur dioxide has been substantially displaced by a member of the group consisting of air an oxygen to decompose water-soluble iron compounds.

2. A process according to claim 1 wherein the spent electrolyte liquor is concentrated so that its liquid phase contains from 900 to 1,150 g/l of sulphuric acid.

3. A process according to claim 1 wherein the concentration of solids in the leach solution is from 1:4 to 1:1.

4. A process which comprises in combination:
   a. roasting a zinc bearing material selected from the group consisting of iron-containing zinc sulphide ore and iron-containing residues from a zinc manufacturing process at a temperature in the range 500°C to 800°C in an atmosphere which contains oxygen and sulphur dioxode to convert the zinc bearing material to a calcine comprising the bulk of the zinc originally present in the zinc bearing material in the form of zinc sulphate;

b. leaching said calcine with water or an aqueous solution at a temperature in the range of 10°C to 100°C, using a solids: liquid ratio up to 2:1 to yield a leach slurry;

c. subjecting said leach slurry to a solids/liquid separation process to yield a leach solution which comprises as dissolved zinc sulphate at least 70 percent of the zinc contained in said calcine, and a residue, which contains silicaceous gangue, and any insoluble iron and lead compounds;

d. electrolysing said leach solution to yield, as a product, metallic zinc and, as an intermediate, spent electrolyte liquor, which is an aqueous solution of sulphuric acid and zinc sulphate;

e. concentrating sulphuric acid in said spent electrolyte liquor so that its liquid phase contains at least 600 g/l of $H_2SO_4$ and the bulk of the zinc sulphate is precipitated; and f. separating this precipitate from the liquor and so obtaining sulphuric acid as a product, the precipitated zinc sulphate being redissolved in the free liquor to the electrolysis step and recycled in subsequent operations, said zinc bearing material being roasted to step (a) in teo steps, wherein the first step comprises reasting said material in an atmosphere comprising oxygen and sulphur dioxide at a temperature in the range from 500° to 800°C to convert the bulk of the zinc into zinc sulphate and the second step comprises maintaining the roast at a temperature in the range from 400° to 700°C in an atmosphere from which sulphur dioxide has been substantially purged to decompose water-soluble iron compounds.

* * * * *